(12) United States Patent
Yano et al.

(10) Patent No.: US 9,266,195 B2
(45) Date of Patent: *Feb. 23, 2016

(54) LASER WELDING METHOD

(75) Inventors: Koji Yano, Chiba (JP); Hiroyuki Sumi, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 199 days.

This patent is subject to a terminal disclaimer.

(21) Appl. No.: 14/008,177

(22) PCT Filed: Apr. 28, 2011

(86) PCT No.: PCT/JP2011/060806
§ 371 (c)(1),
(2), (4) Date: Nov. 26, 2013

(87) PCT Pub. No.: WO2012/132024
PCT Pub. Date: Oct. 4, 2012

(65) Prior Publication Data
US 2014/0076865 A1   Mar. 20, 2014

(30) Foreign Application Priority Data

Mar. 29, 2011  (JP) .................................. 2011-072107
Mar. 29, 2011  (JP) .................................. 2011-073023

(51) Int. Cl.
*B23K 26/26* (2014.01)
*B23K 26/24* (2014.01)
(Continued)

(52) U.S. Cl.
CPC .............. *B23K 26/24* (2013.01); *B23K 26/0608* (2013.01); *B23K 26/26* (2013.01); *B23K 26/3206* (2013.01); *B23K 2203/04* (2013.01)

(58) Field of Classification Search
CPC .... B23K 26/0608; B23K 26/24; B23K 26/26; B23K 26/3206; B23K 2203/04; B23K 26/0617; B23K 26/0604; B23K 26/0613
See application file for complete search history.

(56) References Cited

U.S. PATENT DOCUMENTS 5,624,585 A * 4/1997 Haruta et al. ............ 219/121.63
6,608,278 B1   8/2003 Xie et al.
(Continued)

FOREIGN PATENT DOCUMENTS

DE   38 43 841 A1    6/1990
JP   A 1-99789      4/1989
(Continued)

OTHER PUBLICATIONS

Aug. 16, 2011 Search Report issued in International Patent Application No. PCT/JP2011/060806 (with translation).
(Continued)

*Primary Examiner* — Geoffrey S Evans
(74) *Attorney, Agent, or Firm* — Oliff PLC

(57) ABSTRACT

A laser welding method includes emitting two laser beams along a weld line from an upper surface side of a workpiece, the two laser beams being transmitted through different optical fibers and having in-focus spot diameters of 0.3 mm or larger; emitting the laser beams such that a leading laser beam of the two laser beams and a trailing laser beam of the two laser beams are each inclined toward a direction in which welding proceeds at an incident angle with respect to a direction perpendicular to an upper surface of the workpiece, the leading laser beam being ahead of the trailing laser beam on the upper surface of the workpiece in the direction in which welding proceeds, the trailing laser beam being behind the leading laser beam; and setting the incident angle of the leading laser beam to be larger than the incident angle of the trailing laser beam.

4 Claims, 2 Drawing Sheets

(51) Int. Cl.
  *B23K 26/06* (2014.01)
  *B23K 26/32* (2014.01)

(56) References Cited

U.S. PATENT DOCUMENTS

| | | | |
|---|---|---|---|
| 2004/0200813 A1* | 10/2004 | Alips et al. | 219/121.63 |
| 2005/0028897 A1* | 2/2005 | Kurz et al. | 148/525 |
| 2006/0278618 A1 | 12/2006 | Forrest et al. | |
| 2007/0210042 A1* | 9/2007 | Forrest et al. | 219/121.64 |
| 2008/0116175 A1* | 5/2008 | Ballerini et al. | 219/121.64 |
| 2010/0288738 A1 | 11/2010 | Jones et al. | |
| 2011/0023990 A1 | 2/2011 | Yano et al. | |
| 2011/0215074 A1* | 9/2011 | Wang et al. | 219/121.64 |
| 2014/0124481 A1* | 5/2014 | Yano et al. | 219/121.64 |

FOREIGN PATENT DOCUMENTS

| | | |
|---|---|---|
| JP | A 7-144288 | 6/1995 |
| JP | A 8-90265 | 4/1996 |
| JP | A 9-24480 | 1/1997 |
| JP | A 11-123578 | 5/1999 |
| JP | A 2000-317667 | 11/2000 |
| JP | A 2003-334686 | 11/2003 |
| JP | A 2004-330299 | 11/2004 |
| JP | A 2009-166050 | 7/2009 |
| JP | A 2009-178768 | 8/2009 |
| JP | A 2009-269036 | 11/2009 |
| JP | A 2010-167436 | 8/2010 |
| JP | A 2010-240734 | 10/2010 |
| WO | 2009/123330 A1 | 10/2009 |
| WO | WO-2010/061422 A1 * | 6/2010 |

OTHER PUBLICATIONS

Jun. 15, 2015 Search Report issued in European Application No. 11862667.0.

Sep. 18, 2015 Office Action issued in U.S Appl. No. 14/004,271.

* cited by examiner

LASER WELDING METHOD

TECHNICAL FIELD

The present invention relates to a laser welding method with which spatter formed during welding is prevented from adhering to an upper surface of a workpiece or an optical component and undercut or underfill (that is, depression) is prevented from occurring on a back surface of the workpiece.

BACKGROUND ART

Laser welding can have high-energy density and can achieve a large depth of penetration and high speed welding. Thus, laser welding is expected as a high-efficiency welding method. Since the laser welding causes melting at extremely localized points, the effect of heat applied to a workpiece (for example, a thin steel sheet, a thick steel plate, a stainless steel plate, or a stainless steel sheet) is small and distortion or deformation is slight, leading to a high-quality weld joint. Thus, the laser welding has practically been used in the field of thin steel sheets such as automobile thin steel sheets on an assembly line of members of framework or automobile bodies. Also in the field of thick steel plates, practical use of laser welding has seriously been considered since the weldable plate (sheet) thickness is increased as a result of current commercial sales of highly efficient laser welding machines that can perform optical fiber transmission at high power.

In the laser welding, however, a workpiece rapidly melts because a high-energy density laser beam is converged by an optical component and emitted to a weld portion. Thus, the molten metal may scatter around as spatter from the formed molten weld pool. If the scattered spatter adheres to the workpiece, the external appearance of the weld portion is spoiled. Furthermore, if spatter adheres to a guard glass or an optical component such as a lens, properties of a laser beam such as a focusing property or irradiance level are changed and the performance of the laser welding becomes unstable.

If a large amount of spatter is generated, the amount of molten metal in the molten weld pool decreases, thereby making welding defects such as undercut or underfill (i.e., depression) more likely to occur. The occurrence of undercut or underfill brings about reduction in strength of the weld portion.

In view of these problems, Patent Literature 1, for example, discloses a technology of preventing spatter from scattering into a laser working head by using a laser working head having a double-pipe nozzle configuration and forming a shielding curtain from assist gases ejected from an external nozzle of the head.

Patent Literature 2 discloses a technology of preventing underfill and spatter from occurring by feeding a filler wire to a weld portion subjected to laser welding while swinging the filler wire.

Patent Literature 3 discloses a technology of preventing spatter from adhering to a laser working head and a workpiece by ejecting a fluid sideways to a space between a laser working head and a workpiece.

Patent Literature 4 discloses a technology of preventing spatter from adhering to an optical component or a workpiece by blowing a gas sideways from a position near the workpiece toward spatter scattering from a molten weld pool formed by being irradiated with a laser beam.

CITATION LIST

Patent Literature

PTL 1: Japanese Unexamined Patent Application Publication No. H11-123578

PTL 2: Japanese Unexamined Patent Application Publication No. 2004-330299

PTL 3: Japanese Unexamined Patent Application Publication No. 2003-334686

PTL 4: Japanese Unexamined Patent Application Publication No. 2009-166050

SUMMARY OF INVENTION

Technical Problem

Although the technology disclosed in Patent Literature 1 can prevent spatter from adhering to the inside of a laser working head, the technology cannot prevent spatter from adhering to the tip of the laser working head or a workpiece.

With the technology disclosed in Patent Literature 2, the components of a filler wire to be used change the composition of the weld metal, thereby changing the properties of the weld metal. Thus, a filler wire appropriate for the components of the workpiece has to be selected. Consequently, the burden of stock management of filler wires or production control of filler wire selection is increased.

With the technology disclosed in Patent Literature 3, when a workpiece to be welded has a large plate thickness and requires a large laser power, the amount of spatter scattering around increases. Thus, spatter cannot be completely prevented from adhering to the laser working head and the workpiece.

The technology disclosed in Patent Literature 4 is effective for preventing adhesion of spatter formed on the upper surface side of the workpiece (that is, the side irradiated with a laser beam). With the technology, however, scattering spatter is removed by blowing, and thus the amount of molten metal in the molten weld pool is reduced and welding defects such as an undercut or an underfill are more likely to be formed on the back surface of the workpiece.

In view of these circumstances, an object of the present invention is to provide a laser welding method relating to a butt welding method including welding by irradiating a groove formed between butt surfaces of workpieces with a laser beam from an upper surface side, the laser welding method using no filler wires, preventing spatter from scattering during welding and from adhering to upper surfaces of the workpieces and an optical component, and preventing an undercut or an underfill from being formed on the back surface of the workpiece.

Solution to Problem

The inventors noticed that all the technologies disclosed in Patent Literatures 1 to 4 are to perform laser welding by irradiating a workpiece with a single laser beam emitted perpendicularly to the workpiece. In the case where a workpiece is irradiated with a perpendicularly emitted single laser beam, the energy of the laser beam is focused on the portion of the workpiece irradiated with the laser beam. Thus, the temperature of a molten metal significantly increases and the molten metal swings. Consequently, not only spattering is more likely to occur on the upper surface of the workpiece, but also an undercut or an underfill is more likely to be formed on the back surface of the workpiece.

On the other hand, when two laser beams are used and arranged along a weld line to divide the energy, an increase in temperature of the molten metal or swing of the molten metal can be prevented. Thus, the amount of spatter generated on the upper surface of the workpiece can be reduced and an undercut or an underfill can be prevented from being formed on the back surface of the workpiece. By emitting a laser beam (hereinafter referred to as a leading laser beam) that is ahead of the other laser beam (hereinafter referred to as a trailing laser beam) in a direction in which welding proceeds on the upper surface of the workpiece such that the leading laser beam and the trailing laser beam are inclined toward the direction in which welding proceeds, by setting the incident angle of the leading laser beam to be larger than the incident angle of the trailing laser beam, and by emitting the leading laser beam and the trailing laser beam such that the leading laser beam and the trailing laser beam do not cross each other inside the workpiece, the laser beams are not focused on a single point inside the workpiece, thereby increasing effects of reducing the amount of spatter and preventing undercut or underfill from occurring. Although the details regarding the mechanism that prevents spattering and undercut or underfill from occurring are not known, the following reasons have been presumed. Spatter is prevented from scattering by dividing the energy into two laser beams emitted onto a steel sheet at incident angles, preheating the steel sheet using one of the laser beams that is ahead of the other while suppressing spattering, and then melting the steel sheet using the trailing laser beam. Here, the incident angle of each laser beam indicates the angle, formed, between a direction perpendicular to an upper surface of a workpiece and a direction in which the laser beam is emitted.

The present invention is made in view of these findings.

Specifically, the present invention provides a laser welding method including: emitting two laser beams along a weld line from an upper surface side of a workpiece, the two laser beams being transmitted through different optical fibers and having in-focus spot diameters of 0.3 mm or larger; emitting the laser beams such that a leading laser beam of the two laser beams and a trailing laser beam of the two laser beams are each inclined toward a direction in which welding proceeds at an incident angle with respect to a direction perpendicular to an upper surface of the workpiece, the leading laser beam being ahead of the trailing laser beam on the upper surface of the workpiece in the direction in which welding proceeds, the trailing laser beam being behind the leading laser beam on the upper surface of the workpiece in the direction in which welding proceeds; and setting the incident angle of the leading laser beam to be larger than the incident angle of the trailing laser beam.

In addition, the present invention is the laser welding method in which laser welding is performed by setting a gap between the center of an irradiated area of the upper surface of the workpiece irradiated with the leading laser beam and the center of an irradiated area of the upper surface of the workpiece irradiated with the trailing laser beam to be $6 \times D_{max}$ or smaller where $D_{max}$ is a larger spot diameter among a spot diameter Da of the leading laser beam and a spot diameter Db of the trailing laser beam, and by setting a gap between the center of an emerging area of a back surface of the workpiece from which the leading laser beam emerges and the center of an emerging area of the back surface of the workpiece from which the trailing laser beam emerges so as to fall within a range from $2 \times D_{max}$ to $12 \times D_{max}$ with respect to the larger spot diameter $D_{max}$.

Preferably, the incident angles of the leading laser beam and the trailing laser beam fall within a range from 5 to 50°.

Advantageous Effects of Invention

According to the present invention, when butt welding is performed, spatter can be prevented from scattering from the upper surface of a workpiece during welding and an undercut or an underfill can be prevented from being formed on the back surface of the workpiece.

DESCRIPTION OF EMBODIMENTS

Figure 1:
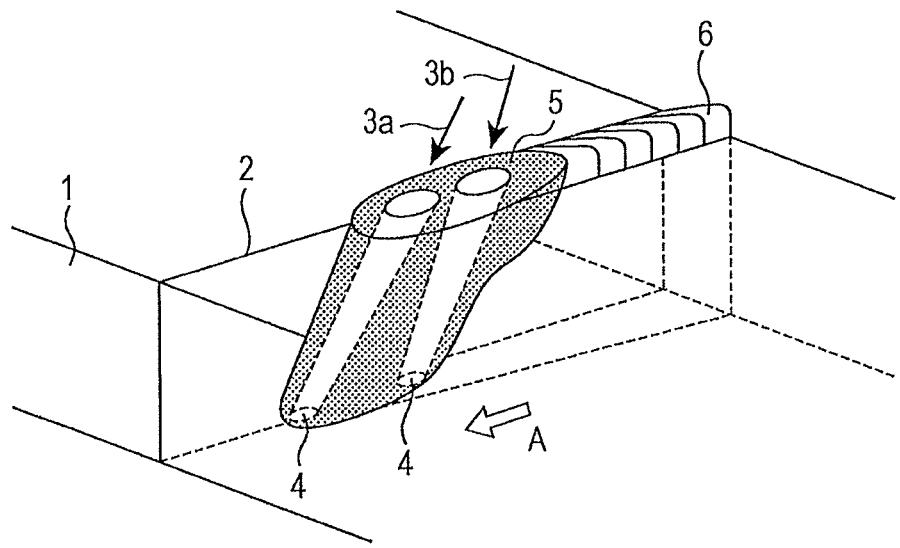
FIG. 1 is a perspective view schematically illustrating a case to which the present invention is applied where welding is performed by using two laser beams.

FIG. 1 is a perspective view schematically illustrating a case to which the present invention is applied where butt welding is performed on workpieces using two laser beams. The arrow A in FIG. 1 indicates a direction in which welding proceeds. A weld line 2 is a line that indicates a joint at which butted steel sheets 1 are joined. FIG. 1 illustrates a deep cavity 4 (hereinafter referred to as a keyhole), which is formed as a result of emission of laser beams 3a and 3b, and a molten metal 5 formed around the keyhole 4 in perspective. Hereinbelow, a case is described where welding is performed on workpieces 1 by taking steel sheets as examples of the workpieces 1.

In the present invention, two laser beams 3a and 3b are emitted from an upper surface side of steel sheets 1 along a weld line 2 between the steel sheets 1. At this time, if a laser beam transmitted through a single optical fiber is divided into two beams by an optical component (for example, a prism) and the two beams are emitted, incident angles of the two beams, which will be described below, cannot be individually set. Moreover, a gap between the center portions of irradiated areas, which will be described below, and the spot diameters cannot be individually set. For this reason, the two laser beams 3a and 3b are required to be transmitted through different optical fibers.

One laser oscillator or two laser oscillators may be used. In the case where there is only one laser oscillator and two laser beams are to be transmitted, an oscillated laser beam is divided into two in the oscillator and then the two laser beams may be transmitted through different optical fibers.

Figure 2:
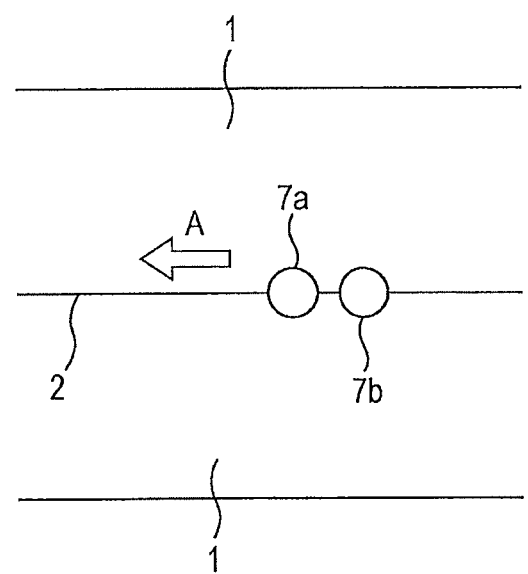
FIG. 2 is a plan view schematically illustrating an example of an arrangement of an irradiated area of the upper surface of a steel sheet illustrated in FIG. 1 irradiated with the leading laser beam, an irradiated area of the upper surface irradiated with the trailing laser beam, and a weld line.

(1) Gap Between Irradiated area Irradiated with Laser Beam and Weld Line on Upper Surface of Steel Sheet As illustrated in FIG. 1, the laser beams 3a and 3b are arranged at the front and back along the weld line 2. One laser beam that is ahead of the other laser beam on the upper surface of the steel sheet 1 in the direction in which welding proceeds is defined as a leading laser beam 3a, while the trailing laser beam that is behind the leading laser beam 3a is defined as a trailing laser beam 3b. FIG. 2 is a plan view schematically illustrating an example of an arrangement of an irradiated area 7a of the upper surface of the steel sheet 1 irradiated with the leading laser beam 3a, an irradiated area 7b of the upper surface irradiated with the trailing laser beam 3b, and the weld line 2.

Preferably, the centers of the irradiated areas 7a and 7b of the upper surface of the steel sheet 1 respectively irradiated with the leading laser beam 3a and the trailing laser beam 3b are positioned so as to coincide with the weld line 2, as illustrated in FIG. 2. It is, however, difficult to perform welding while these beams 3a and 3b are kept being positioned in the above-described manner, and thus the centers of the irradiated areas 7a and 7b of the upper surface of the steel sheet 1 do not always coincide with the weld line 2 during the welding operation. When the gap between the weld line 2 and the center of each irradiated area 7a or 7b increases, the leading laser beam 3a or the trailing laser beam 3b deviates from the butt groove and thus welding defects such as incomplete melting of the groove are more likely to occur.

Although the centers of the irradiated areas 7a and 7b do not coincide with the weld line 2, if welding is performed such that the weld line 2 passes the range within the irradiated areas 7a and 7b, welding defects do not occur. Thus, it is preferable that the gap between the weld line 2 and the center of each irradiated area 7a or 7b be within the radius of the irradiated area 7a or 7b.

(2) In-Focus Spot Diameters of Leading Laser Beam and Trailing Laser Beam

The in-focus spot diameters of the leading laser beam 3a and the trailing laser beam 3b have to be 0.3 mm or larger. Here, the in-focus spot diameter is a beam diameter at a focused position when each laser beam 3a or 3b is optically focused. Thus, the laser beam has the highest energy density at the in-focus position. When the in-focus spot diameters of the laser beams 3a and 3b are smaller than 0.3 mm, a weld bead 6 has a narrow width during welding and part of the groove remains unmolten. On the other hand, if the spot diameters exceed 1.2 mm, the laser beams have a small energy density and thus a keyhole 4 is more likely to become unstable. Thus, preferably, the in-focus spot diameters of the laser beams 3a and 3b are 1.2 mm or smaller.

The keyhole 4 is formed due to evaporating pressure and evaporating reaction force that occur when the steel sheet 1 melts and the molten metal 5 evaporates as a result of emission of the laser beams 3a and 3b. Thus, the keyhole 4 needs to be stabilized in order to stably perform butt welding on the steel sheets 1 by applying the present invention.

Preferably, the in-focus spots of the laser beams 3a and 3b have a circular shape, but may have an oval figure. In the case where the spots have an oval figure, the minor axis of the in-focus spot of each beam is set so as to exceed 0.3 mm or larger. In addition, the minor axis is preferably 1.2 mm or smaller for the same reason as in the case of the circular spot.

(3) Distance from Upper Surface of Steel Sheet to Focus

The distance from the upper surface of the steel sheet 1 to the focus of each laser beam 3a or 3b is denoted by t (mm) and the thickness of the steel sheet 1 is denoted by T (mm). If the distance t from the upper surface of the steel sheet 1 to the focus exceeds $-3 \times T$ (specifically, 3T upward from the upper surface), the position of the focus is too high, making it difficult to stably maintain the keyhole 4. On the other hand, if the distance t exceeds $3 \times T$ (specifically, 3T downward from the upper surface), the position of the focus is too low, making spatter more likely to be formed from the back surface of the steel sheet 1. Thus, the distance t from the upper surface of the steel sheet 1 to the focus is preferably set so as to fall within a range from $-3 \times T$ to $3 \times T$.

Figure 3:
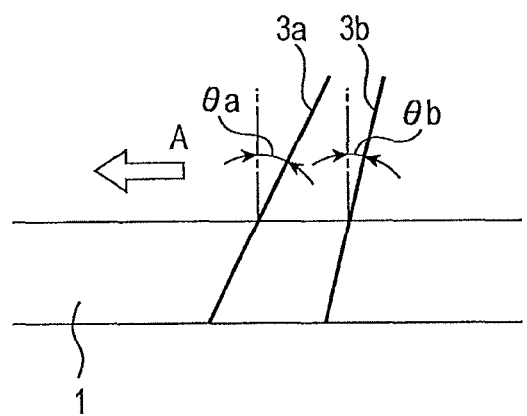
FIG. 3 is a side view schematically illustrating an example of an arrangement of the leading laser beam and the trailing laser beam illustrated in FIG. 1 and lines perpendicular to the upper surface of a steel sheet.

(4) Incident Angle of Leading Laser Beam and Incident Angle of Trailing Laser Beam FIG. 3 is a side view schematically illustrating an example of an arrangement of the leading laser beam 3a and the trailing laser beam 3b illustrated in FIG. 1 and lines perpendicular to the upper surface of the steel sheet 1. As illustrated in FIG. 3, the leading laser beam 3a and the trailing laser beam 3b are emitted onto the upper surface of the steel sheet 1 while being inclined toward the direction in which welding proceeds indicated by the arrow A. When an angle θa formed between the leading laser beam 3a and a line perpendicular to the upper surface of the steel sheet 1 is defined as an incident angle of the leading laser beam 3a and an angle θb formed between the trailing laser beam 3b and a line perpendicular to the surface of the steel sheet 1 is defined as an incident angle of the trailing laser beam 3b, the incident angles are set so as to satisfy θa>θb.

In addition, the leading laser beam 3a and the trailing laser beam 3b are arranged so as not to cross each other inside the steel sheet 1. When the distance from the upper surface of the steel sheet 1 to an intersection of the leading laser beam 3a and the trailing laser beam 3b is denoted by X (mm) and the sheet thickness of the steel sheet 1 is denoted by T (mm), it is preferable that X be set within a range 0 (i.e., the upper surface of the steel sheet 1)≤X≤2×T (i.e., 2T upward from the upper surface of the steel sheet 1). The reason for this setting is as follows. In the case where X<0, the leading laser beam 3a and the trailing laser beam 3b cross each other inside the steel sheet 1. Thus, the keyholes 4 of the leading laser beam 3a and the trailing laser beam 3b are combined with each other and form a large keyhole, thereby easily forming a large amount of spatter. On the other hand, in the case where X>2×T, the molten metal 5 separates and thus the molten state of butted portion becomes unstable, thereby easily forming a large amount of spatter.

When the incident angle θa of the leading laser beam 3a and the incident angle θb of the trailing laser beam 3b are set so as to satisfy θa<θb, the distance from the upper surface to the back surface of the steel sheet 1 for which the trailing laser beam 3b transmits increases. Thus, the energy of the trailing laser beam 3b is attenuated and the heating efficiency is reduced. Thus, the melting state of the butted portion that is being molten by the trailing laser beam 3b becomes unstable although the preheating effect of the leading laser beam 3a on the butted portion is obtained.

If, on the other hand, the incident angles θa and θb are set so as to satisfy θa=θb, the keyholes 4 of the leading laser beam 3a and the trailing laser beam 3b become more likely to be combined with each other and form a large keyhole. Thus, a large amount of spatter may be formed.

For this reason, the incident angles of the leading laser beam 3a and the trailing laser beam 3b have to be set so as to satisfy θa>θb. Specifically, the inclination angle θa of the leading laser beam 3a is set to be larger to prevent spattering from occurring when preheating the butted portion. The inclination angle θb of the trailing laser beam 3b is set to be smaller to increase heating efficiency when melting the butted portion.

Consequently, spattering can be made less likely to occur and thus an undercut or an underfill can be prevented from being formed.

If the incident angle θa of the leading laser beam 3a is below 5°, the incident angle θa is too small and the leading laser beam 3a operates similarly as in the case where the leading laser beam 3a is vertically emitted. Thus, the leading laser beam 3a cannot have the effect of preventing spattering from occurring. On the other hand, if the incident angle θa exceeds 50°, the distance from the upper surface to the back surface of the steel sheet 1 for which the leading laser beam 3a transmits increases and the energy of the leading laser beam 3a is attenuated. Thus, the leading laser beam 3a cannot have a sufficiently large preheating effect. Therefore, it is preferable that the incident angle θa of the leading laser beam 3a be within a range from 5 to 50°.

Similarly, if the incident angle θb of the trailing laser beam 3b is below 5°, the incident angle θb is too small and the trailing laser beam 3b operates similarly as in the case where the trailing laser beam 3b is vertically emitted. Thus, the trailing laser beam 3b cannot have the effect of preventing spattering from occurring. On the other hand, if the incident angle θb exceeds 50°, the distance from the upper surface to the back surface of the steel sheet 1 for which the trailing laser beam 3b transmits increases and the energy of the trailing laser beam 3b is attenuated. Thus, the trailing laser beam 3b cannot penetrate the molten metal to a sufficient depth. Therefore, it is preferable that the incident angle θb of the trailing laser beam 3b be within a range from 5 to 50°.

(5) Gap Between Center Points of Leading Laser Beam and Trailing Laser Beam on Upper Surface of Steel Sheet When a gap $L_1$ between the centers of the irradiated areas 7a and 7b of the upper surface of the steel sheet 1 respectively irradiated with the leading laser beam 3a and the trailing laser beam 3b is too large, the molten metal 5 separates and spattering is more likely to occur. Thus, the gap $L_1$ between the centers of the irradiated areas 7a and 7b on the upper surface of the steel sheet 1 is set to be $6 \times D_{max}$ or smaller where $D_{max}$ denotes a larger spot diameter among the in-focus spot diameters Da and Db of the laser beams 3a and 3b.

Figure 4:
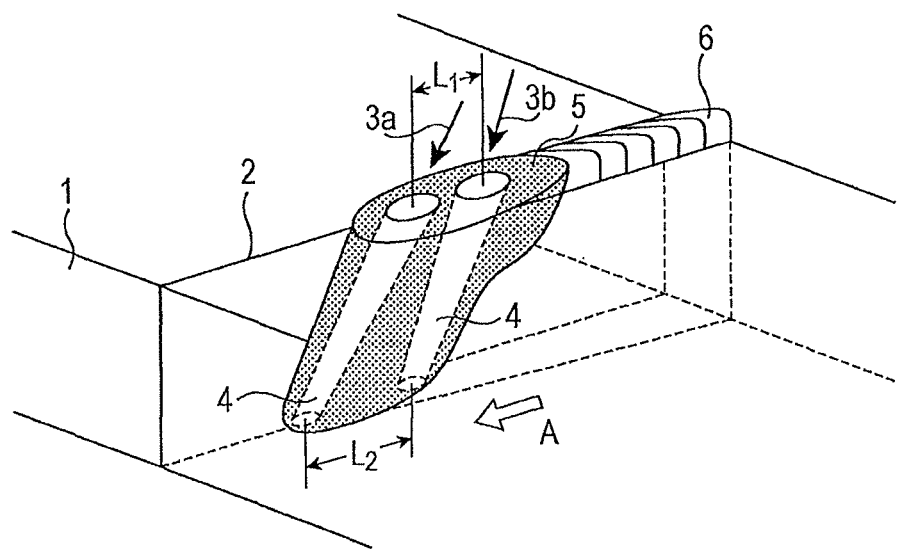
FIG. 4 is a perspective view schematically illustrating a second example of the present invention to which the present invention is applied where welding is performed by using two laser beams.

(6) Gap Between Centers of Emerging Areas of Back Surface of Steel Sheet from which Leading Laser Beam and Trailing Laser Beam Emerge As illustrated in FIG. 4, an emerging area of the back surface of the steel sheet 1 from which the leading laser beam 3a emerges is positioned ahead in the direction in which welding proceeds indicated by the arrow A and an emerging area of the back surface of the steel sheet 1 from which the trailing laser beam 3b emerges is positioned behind the emerging area of the leading laser beam 3a. A gap $L_2$ between the centers of the emerging areas is set so as to fall within a range from $2 \times D_{max}$ to $12 \times D_{max}$, so that the trailing laser beam 3b can penetrate the molten metal to a sufficient depth and an underfill can be prevented from being formed on the back surface of the steel sheet 1.

(7) Oscillator of Laser Beam

Any of various forms of oscillators can be used as a laser beam oscillator used in the present invention. Preferable examples of the oscillator include a gas laser using a gas (for example, carbon dioxide gas, helium-neon, argon, nitrogen, and iodine) as a medium; a solid laser using a solid (for example, YAG into which a rare earth element is doped) as a medium; and a fiber laser using a fiber as a laser medium instead of bulk. Alternatively, a semiconductor laser may be used.

In the above described manner, according to the present invention, butt welding can be performed while spatter is prevented from scattering from the upper surface of a workpiece during the welding operation or while an undercut or an underfill is prevented from being formed on the back surface of the workpiece.

The present invention can be applied not only to the butt welding of workpieces (for example, thin steel sheets, thick steel plates, stainless steel plates, or stainless steel sheets) but also to performing welding for manufacturing a welded pipe by forming such workpieces into a cylinder.

Example 1

As illustrated in FIG. 1, when butt welding is to be performed on stainless steel sheets (SUS304, having a thickness of 5 mm) used as the workpieces 1, laser beams oscillated by two laser oscillators are used as the leading laser beam 3a and the trailing laser beam 3b and irradiated areas 7a and 7b are positioned on the weld line 2 as illustrated in FIG. 2. Welding conditions are made as illustrated in Table 1. The distance t (mm) from the upper surface of each stainless steel sheet 1 to the focus is fixed to ½T with respect to the sheet thickness T. The distance X (mm) from the upper surface of each stainless steel sheet 1 to the intersection of the leading laser beam 3a and the trailing laser beam 3b is fixed to ½T with respect to the sheet thickness T. The laser beam incident angles θa and θb shown in Table 1 indicate the angles illustrated in FIG. 3. Incident angles having negative values indicate that the laser beams are emitted while being inclined toward a direction opposite to the direction A in which welding proceeds.

Examples of the invention shown in Table 1 (joint Nos. 2, 4, 5, 6, and 9) are formed by making the in-focus spot diameters of the leading laser beam 3a and the trailing laser beam 3b satisfy the range according to the present invention, by emitting the leading laser beam 3a and the trailing laser beam 3b such that the laser beams 3a and 3b are inclined toward the direction in which welding proceeds, and by setting the incident angle θa of the leading laser beam 3a to be larger than the incident angle θb of the trailing laser beam 3b.

In comparative examples shown in Table 1, a joint No. 1 is an example obtained when the incident angle θb of the trailing laser beam 3b is set to 0° (that is, by vertically emitting the trailing laser beam 3b), a joint No. 3 is an example obtained when the in-focus spot diameter of the leading laser beam 3a is out of the range according to the present invention, a joint No. 7 is an example obtained when the trailing laser beam 3b is emitted by being inclined toward a direction opposite to the direction in which welding proceeds, and a joint No. 8 is an example obtained when the leading laser beam 3a and the trailing laser beam 3b are emitted by being inclined toward a direction opposite to the direction in which welding proceeds.

After laser welding was performed in the above-described ways, the upper surface of each stainless steel sheet 1 was visually inspected to check whether or not spatter has adhered thereto. In addition, a weld bead on the back surface of each stainless steel sheet 1 was visually inspected to check whether or not an undercut or an underfill has been formed. The results of the inspections are shown in Table 2.

As is clear from Table 2, neither adhesion of spatter nor occurrence of undercut/underfill was perceived in the examples according to the invention.

Among the comparative examples illustrated in Table 2, in the joint No. 1, a large amount of spatter adhered to the stainless steel sheets 1 and underfill occurred in the weld bead since the joint No. 1 was obtained by setting the incident angle θb of the trailing laser beam 3b to 0°. In the joint No. 3, spattering was not prevented and underfill occurred in the weld bead since the joint No. 3 was obtained by setting the in-focus spot diameter of the leading laser beam 3a to a small diameter. In the joint No. 7, a large amount of spatter adhered to the stainless steel sheet 1 and underfill occurred in the weld bead since the joint No. 7 was obtained by inclining the trailing laser beam 3b toward a direction opposite to the direction A in which welding proceeds. In the joint No. 8, a large amount of spatter adhered to the stainless steel sheet 1 and underfill occurred in the weld bead since the joint No. 8 was obtained by inclining the leading laser beam 3a and the trailing laser beam 3b toward a direction opposite to the direction in which welding proceeds.

Example 2

As illustrated in FIG. 4, when butt welding is to be performed on stainless steel sheets and plates (SUS304, having thicknesses of 5 mm and 10 mm) used as the workpieces 1, laser beams oscillated by two laser oscillators are used as the leading laser beam 3a and the trailing laser beam 3b and irradiated areas 7a and 7b are positioned on the weld line 2 as illustrated in FIG. 2. Welding conditions are made as illustrated in Table 3. The distance t (mm) from the upper surface of each stainless steel plate (sheet) 1 to the focus is fixed to ½T with respect to the plate (sheet) thickness T. The distance X (mm) from the upper surface of each stainless steel plate (sheet) 1 to the intersection of the leading laser beam 3a and the trailing laser beam 3b is set to 0, ¼T, ½T, or T with respect to the sheet thickness T. The laser beam incident angles θa and θb shown in Table 3 indicate the angles illustrated in FIG. 3. Incident angles having negative values indicate that the laser beams are emitted while being inclined toward a direction opposite to the direction in which welding proceeds indicated by the arrow A.

Examples of the invention shown in Table 3 (joint Nos. 2 to 4, 6, 7, and 11) are formed by making the gap $L_1$ between the centers of the irradiated areas 7a and 7b of the upper surfaces of the stainless steel plates (sheets) 1 irradiated with the leading laser beam 3a and the trailing laser beam 3b and the gap $L_2$ between the centers of the emerging areas of the back surfaces satisfy the ranges according to the present invention and by emitting the leading laser beam 3a and the trailing laser beam 3b such that the leading laser beam 3a and the trailing laser beam 3b are inclined toward the direction in which welding proceeds.

In comparative examples shown in Table 3, a joint No. 1 is an example obtained when the incident angle θb of the trailing laser beam 3b is set to 0° (that is, by vertically emitting the trailing laser beam 3b), joint Nos. 5, 8, and 10 are examples obtained when the gap $L_2$ between the centers of the emerging areas of the back surfaces is out of the range according to the present invention, a joint No. 9 is an example obtained when the gap $L_1$ between the centers of the irradiated areas of the upper surfaces and the gap $L_2$ between the centers of the emerging areas of the back surfaces are out of the ranges according to the present invention, and a joint No. 12 is an example obtained when the laser beams 3a and 3b are emitted by being inclined toward a direction opposite to the direction in which welding proceeds.

After laser welding was performed in the above-described ways, the upper surface of each stainless steel plate (sheet) 1 was visually inspected to check whether or not spatter has adhered thereto. In addition, a weld bead on the back surface of each stainless steel plate (sheet) 1 was visually inspected to check whether or not an undercut or an underfill has been formed. The results of the inspections are shown in Table 4.

As is clear from Table 4, neither adhesion of spatter nor occurrence of undercut/underfill was perceived in the examples according to the invention.

Among the comparative examples illustrated in Table 4, in the joint No. 1, a large amount of spatter adhered to the stainless steel plates (sheets) 1 and underfill occurred in the weld bead since the joint No. 1 was obtained by setting the incident angle θb of the trailing laser beam 3b to 0°. In the joint No. 5, spatter adhered to the stainless steel plates (sheets) 1 and underfill occurred in the weld bead since the joint No. 5 is obtained by setting the incident angle θa of the leading laser beam 3a so as to be out of the range according to the present invention and thus the preheating effect is not sufficiently large. In the joint Nos. 8 and 10, underfill occurred on the back surfaces since the joint Nos. 8 and 10 are obtained by setting the gap $L_2$ between the centers of the emerging areas of the back surfaces so as to be out of the range according to the present invention. In the joint No. 9, a large amount of spatter adhered to the stainless steel plates (sheets) 1 and underfill occurred in the weld bead since the joint No. 9 is obtained by setting the gap $L_1$ between the centers of the irradiated areas of the upper surfaces and the gap $L_2$ between the centers of the emerging areas of the back surfaces so as to be out of the ranges according to the present invention. In the joint No. 12, a large amount of spatter adhered to the stainless steel plates (sheets) 1 and underfill occurred in the weld bead since the joint No. 12 is obtained by inclining the leading laser beam 3a and the trailing laser beam 3b toward a direction opposite to the direction in which welding proceeds.

INDUSTRIAL APPLICABILITY

The present invention is remarkably effective from the industrial point of view because, when butt welding is performed, spatter can be prevented from scattering from the upper surface of a workpiece during welding and an undercut or an underfill can be prevented from being formed on the back surface of the workpiece.

REFERENCE SIGNS LIST 1 workpiece
2 weld line
3a leading laser beam
3b trailing laser beam
4 keyhole
5 molten metal
6 weld bead
7a irradiated area irradiated with leading laser beam
7b irradiated area irradiated with trailing laser beam
θa incident angle of leading laser beam 3a
θb incident angle of trailing laser beam 3b
L1 distance between centers of irradiated areas of upper surface of workpiece irradiated with leading laser beam and trailing laser beam
L2 distance between centers of emerging areas of back surface of workpiece from which leading laser beam and trailing laser beam emerge
Da in-focus spot diameter of leading laser beam 3a
Db in-focus spot diameter of trailing laser beam 3b
$D_{max}$ larger spot diameter between spot diameter Da of leading laser beam and spot diameter Db of the trailing laser beam

TABLE 1

| | | | | Welding conditions | | | |
|---|---|---|---|---|---|---|---|
| Join No. | Laser beam | Laser power (kW) | In-focus spot diameter (mm) | Incident angle of laser beam (deg.) | | Distance between center of irradiated areas and welded line (mm) | Welding speed (m/min) | Remarks |
| 1 | Leading | 10 | 0.52 | θa | 25 | 0 | 10 | Comparative example |
| | Trailing | 10 | 0.52 | θb | 0 | 0 | | |

TABLE 1-continued

| Join No. | Laser beam | Laser power (kW) | In-focus spot diameter (mm) | Incident angle of laser beam (deg.) | Distance between center of irradiated areas and welded line (mm) | Welding speed (m/min) | Remarks |
|---|---|---|---|---|---|---|---|
| 2 | Leading | 10 | 0.52 | θa 40 | 0 | 10 | Example of invention |
|   | Trailing | 10 | 0.52 | θb 15 | 0 |   |   |
| 3 | Leading | 10 | 0.27 | θa 45 | 0 | 10 | Comparative example |
|   | Trailing | 10 | 0.52 | θb 20 | 0 |   |   |
| 4 | Leading | 7.5 | 0.81 | θa 45 | 0 | 7.5 | Example of invention |
|   | Trailing | 9 | 0.81 | θb 20 | 0.5 |   |   |
| 5 | Leading | 10 | 1.1 | θa 50 | 0 | 10 | Example of invention |
|   | Trailing | 10 | 0.52 | θb 30 | 0 |   |   |
| 6 | Leading | 8 | 1.1 | θa 45 | 0.5 | 7.5 | Example of invention |
|   | Trailing | 7.5 | 0.52 | θb 20 | 0 |   |   |
| 7 | Leading | 8 | 0.32 | θa 15 | 0 | 7.5 | Comparative example |
|   | Trailing | 9 | 0.52 | θb −10 | 0 |   |   |
| 8 | Leading | 7.5 | 0.81 | θa −10 | 0 | 7.5 | Comparative example |
|   | Trailing | 9 | 0.48 | θb −35 | 0 |   |   |
| 9 | Leading | 10 | 0.52 | θa 35 | 0 | 12 | Example of invention |
|   | Trailing | 10 | 0.32 | θb 10 | 0 |   |   |

TABLE 2

| Join No. | Whether or not spatter adheres to upper surface of workpiece | Appearance of back surface of workpiece | Remarks |
|---|---|---|---|
| 1 | Large amount of spatter adhered | Underfill occurred | Comparative example |
| 2 | Not adhered | Good | Example of invention |
| 3 | Small amount of spatter adhered | Underfill occurred | Comparative example |
| 4 | Not adhered | Good | Example of invention |
| 5 | Not adhered | Good | Example of invention |
| 6 | Not adhered | Good | Example of invention |
| 7 | Large amount of spatter adhered | Underfill occurred | Comparative example |
| 8 | Large amount of spatter adhered | Underfill occurred | Comparative example |
| 9 | Not adhered | Good | Example of invention |

TABLE 3

| Join No. | Plate (Sheet) thickness T (mm) | Laser beam | Laser power (kw) | In-focus spot diameter (mm) | Incident angle (°) | Distance L1 between centers of irradiated areas on upper surface (mm) | Welding speed (m/min) | Distance L2 between centers of emerging areas on back surface (mm) | Distance X from upper surface to intersection of leading laser beam and trailing laser beam (mm) | Remarks |
|---|---|---|---|---|---|---|---|---|---|---|
| 1 | 5 | Leading | 10 | Da 0.52 | θa 30 | 1.4 | 10 | 4.3 | 1/2T | Comparative example |
|   |   | Trailing | 10 | Db 0.52 | θb 0 |   |   |   |   |   |
| 2 | 5 | Leading | 10 | Da 0.52 | θa 35 | 1.1 | 10 | 3.2 | 1/2T | Example of invention |
|   |   | Trailing | 10 | Db 0.52 | θb 15 |   |   |   |   |   |
| 3 | 5 | Leading | 10 | Da 0.52 | θa 40 | 2.4 | 10 | 4.0 | T | Example of invention |
|   |   | Trailing | 10 | Db 0.52 | θb 20 |   |   |   |   |   |
| 4 | 5 | Leading | 10 | Da 0.48 | θa 45 | 0.7 | 10 | 3.3 | 1/4T | Example of invention |
|   |   | Trailing | 10 | Db 0.52 | θb 25 |   |   |   |   |   |
| 5 | 5 | Leading | 10 | Da 0.52 | θa 60 | 2.9 | 10 | 8.7 | 1/2T | Comparative example |
|   |   | Trailing | 10 | Db 0.52 | θb 30 |   |   |   |   |   |
| 6 | 5 | Leading | 7 | Da 0.48 | θa 30 | 1 | 7.5 | 3 | 1/2T | Example of invention |
|   |   | Trailing | 9 | Db 0.48 | θb 10 |   |   |   |   |   |
| 7 | 5 | Leading | 8 | Da 0.52 | θa 50 | 0 | 7.5 | 3.1 | 0 | Example of invention |
|   |   | Trailing | 8 | Db 0.52 | θb 30 |   |   |   |   |   |
| 8 | 5 | Leading | 8 | Da 0.48 | θa 45 | 2.1 | 7.5 | 6.2 | 1/4T | Comparative example |
|   |   | Trailing | 10 | Db 0.48 | θb 15 |   |   |   |   |   |
| 9 | 10 | Leading | 10 | Da 0.52 | θa 45 | 3.2 | 4.5 | 9.5 | 1/2T | Comparative example |
|   |   | Trailing | 10 | Db 0.48 | θb 20 |   |   |   |   |   |
| 10 | 10 | Leading | 10 | Da 0.52 | θa 50 | 1.5 | 5 | 7.7 | 1/4T | Comparative example |
|   |   | Trailing | 10 | Db 0.52 | θb 30 |   |   |   |   |   |

TABLE 3-continued

| | | | | | | Welding conditions | | | | |
|---|---|---|---|---|---|---|---|---|---|---|
| Join No. | Plate (Sheet) thickness T (mm) | Laser beam | Laser power (kw) | In-focus spot diameter (mm) | Incident angle (°) | | Distance L1 between centers of irradiated areas on upper surface (mm) | Welding speed (m/min) | Distance L2 between centers of emerging areas on back surface (mm) | Distance X from upper surface to intersection of leading laser beam and trailing laser beam (mm) | Remarks |
| 11 | 10 | Leading | 10 | Da 0.81 | θa | 45 | 2.7 | 6 | 8 | 1/2T | Example of invention |
| | | Trailing | 10 | Db 0.52 | θb | 25 | | | | | |
| 12 | 10 | Leading | 10 | Da 0.52 | θa | −5 | 4.9 | 5 | 9.8 | T | Comparative example |
| | | Trailing | 10 | Db 0.52 | θb | −30 | | | | | |

TABLE 4

| Join No. | Whether or not spatter adheres to upper surface of workpiece | Appearance of back surface of workpiece | Remarks |
|---|---|---|---|
| 1 | Large amount of spatter adhered | Underfill occurred | Comparative example |
| 2 | Not adhered | Good | Example of invention |
| 3 | Not adhered | Good | Example of invention |
| 4 | Not adhered | Good | Example of invention |
| 5 | Large amount of spatter adhered | Underfill occurred | Comparative example |
| 6 | Not adhered | Good | Example of invention |
| 7 | Not adhered | Good | Example of invention |
| 8 | Small amount of spatter adhered | Underfill occurred | Comparative example |
| 9 | Large amount of spatter adhered | Underfill occurred | Comparative example |
| 10 | Small amount of spatter adhered | Underfill occurred | Comparative example |
| 11 | Not adhered | Good | Example of invention |
| 12 | Large amount of spatter adhered | Underfill occurred | Comparative example |

The invention claimed is:

1. A laser welding method comprising:
emitting two laser beams along a weld line from an upper surface side of a workpiece, the two laser beams being transmitted through different optical fibers and having in-focus spot diameters of 0.3 mm or larger;
emitting the laser beams such that a leading laser beam of the two laser beams and a trailing laser beam of the two laser beams are each inclined toward a direction in which welding proceeds at an incident angle with respect to a direction perpendicular to an upper surface of the workpiece, the leading laser beam being ahead of the trailing laser beam on the upper surface of the workpiece in the direction in which welding proceeds, the trailing laser beam being behind the leading laser beam on the upper surface of the workpiece in the direction in which welding proceeds; and
setting the incident angle of the leading laser beam with respect to the perpendicular to be larger than the incident angle of the trailing laser beam.

2. The laser welding method according to claim 1, wherein laser welding is performed by setting a gap between the center of an irradiated area of the upper surface of the workpiece irradiated with the leading laser beam and the center of an irradiated area of the upper surface of the workpiece irradiated with the trailing laser beam to be $6 \times D_{max}$ or smaller, where $D_{max}$ is a larger spot diameter among a spot diameter Da of the leading laser beam and a spot diameter Db of the trailing laser beam, and by setting a gap between the center of an emerging area of a back surface of the workpiece from which the leading laser beam emerges and the center of an emerging area of the back surface of the workpiece from which the trailing laser beam emerges so as to fall within a range from $2 \times D_{max}$ to $12 \times D_{max}$ with respect to the larger spot diameter $D_{max}$.

3. The laser welding method according to claim 1, wherein the incident angles of the leading laser beam and the trailing laser beam fall within a range from 5 to 50°.

4. The laser welding method according to claim 2, wherein the incident angles of the leading laser beam and the trailing laser beam fall within a range from 5 to 50°.

* * * * *